United States Patent [19]

Alafandi et al.

[11] 4,142,995

[45] Mar. 6, 1979

[54] METHOD OF PRODUCING ZEOLITIC CATALYSTS WITH SILICA ALUMINA MATRIX

[75] Inventors: Hamid Alafandi, Woodland Hills; Dennis Stamires, Newport Beach, both of Calif.

[73] Assignee: Filtrol Corporation, Los Angeles, Calif.

[21] Appl. No.: 769,118

[22] Filed: Feb. 16, 1977

[51] Int. Cl.² .................. B01J 29/06; B01J 37/02
[52] U.S. Cl. .......................... 252/455 Z; 252/453
[58] Field of Search ..................... 252/455 Z, 453

[56] References Cited

U.S. PATENT DOCUMENTS

| | | | |
|---|---|---|---|
| 3,449,265 | 6/1969 | Gladrow et al. | 252/455 Z |
| 3,542,670 | 11/1970 | Erickson et al. | 208/120 |
| 3,557,024 | 1/1971 | Young et al. | 252/455 Z |
| 3,558,476 | 1/1971 | Robbins et al. | 252/455 Z |
| 3,609,103 | 9/1971 | Gladrow et al. | 252/455 Z |

*Primary Examiner*—Carl Dees
*Attorney, Agent, or Firm*—Philip Subkow; Bernard Kriegel

[57] ABSTRACT

This invention relates to zeolitic catalysts composed of an exchanged zeolite of the faujasite type and a matrix composed of alumina and an alumina-silica component.

3 Claims, No Drawings

METHOD OF PRODUCING ZEOLITIC CATALYSTS WITH SILICA ALUMINA MATRIX

BACKGROUND OF THE INVENTION

The prior art has used alumina or silica alumina gels as matrix for exchanged zeolites of the faujasite type as, for an example, in the Plank et al. U.S. Pat. No. 3,140,249. The Filtrol Corporation has for many years sold catalysts composed of rare earth exchange zeolites mixed with alumina and clay produced by spray drying a slurry of the zeolite, hydrated alumina and clay. The clay may be either acid treated halloysite or, ball clay, or other kaolins, or mixtures thereof.

The art of formulation of catalysts composed of zeolites, alumina and clay is well known to those skilled in the art.

Reference may be had to applications Ser. No. 696,889, filed June 17, 1976 and Ser. No. 514,567 filed Oct. 15, 1974 U.S. Pat. No. 4,010,116 for further description of such catalysts and for improvements therein disclosed and claimed therein.

STATEMENT OF THE INVENTION

We have discovered that the addition of the silica-alumina gel to the catalyst precursor slurry composed of the exchange zeolite of the faujasite type, hydrated alumina and clay and subsequently spray drying of the slurry produces a cracking catalyst which is improved in its catalytic properties. Catalytic activity is usually expressed as M, S and S+ activity, being the activity determined after treatment with steam for two hours at 1450° F (M activity), for two hours at 1550° F (S+ activity).

The activity is determined by the improved microactivity test as described in Oil and Gas Journal, see issues of 1966, Vol. 64, No. 39, pp. 7, 84 and 85, and Nov. 22, 1971, pp. 60–68.

One of the desirable characteristics of a cracking catalyst of the type employed in fluid catalytic properties is its resistance to attrition. The prior art catalysts produced by spray drying a slurry of zeolite for example of the Y type and the X type (see Milton U.S. Pat. No. 2,882,244 and Breck Pat. No. 3,130,007) and also see Secor U.S. Pat. No. 3,140,249 and hydrated alumina, for example, pseudoboehmite and clay have attrition resistances which the inventions of the aforesaid applications improve. The attrition index, determined as described in the aforesaid applications, tests the % loss when the spray dried catalysts are subjected to abrasion when suspended in an air stream. The details of the test is described in the aforesaid applications to which reference is made. The lower the Abrasion Index, which gives the percent loss of the pellets of catalyst, the better. It is desirable that this Abrasion Index be about 20 and preferably less.

The conventional ratios of the zeolite, hydrated alumina employed in the prior art zeolite catalysts may be employed in the catalysts in our invention, but a portion of the clay component is substituted by the hydrated silica-alumina gel employed preferably as an encapsulation of the zeolite component in the precursor slurry.

The hydrated alumina which is preferred is in the form of pseudoboehmite. The compositions and properties of this hydrated alumina is discussed as described in the aforesaid application to which reference is made. These applications are incorporated herein by this reference.

The ratios of the weights in the prior art catalysts, of the exchange faujasite type to the alumina and to the clay on a volatile free basis in such catalysts may be in the range of about 10 to 30 parts by weight of the zeolite to 10 to 25 parts by weight of the alumina to 80 to 40 parts by weight of clay. For example, the catalysts of the prior art may consist of about 19% of the Y type polyvalent exchanged faujasite, 18% of alumina and 63% of a mixture of acid treated halloysite and ball clay all on a volatile free basis.

The catalyst of our invention is preferably in the form of microspheres comprising the following four components in about the following ranges of weight ratios; the weight ratio of the zeolite which has been exchanged with a polyvalent cation to alumina and silica-alumina and clay is usefully in ratios of weights of components in the range of about 10 to about 30 parts by weight of the polyvalent exchanged zeolite; 10 to 25 parts by weight of the alumina and 60 to 10 parts by weight of silica-alumina and 70 to 10 parts by weight of kaolin clay all on a volatile free basis and the sum of all parts by weight adding to 100 parts by weight on a volatile free basis.

We have found that the substitution of a part of the clay, for example, from 25 to 75% by weight of the clay component in the prior art composition of exchange zeolite alumina and clay, by silica alumina derived from the silica alumina gel preferably as an encapsulation of the zeolite substantially improves the properties of the catalyst.

We believe it to be undesirable to replace the entire clay component either by the alumina or the silica alumina gel. The clay imparts a degree of porosity and permeability to the spray dried particle which is desirable.

The production of the silica alumina gel as a separate component for addition to the precursor slurry is a difficult and tedious process. The procedure for production of the gel for use as a matrix requires that the gel be thoroughly washed to reduce the sodium content to levels which will not raise the sodium content of the finished catalyst to unacceptable levels, for example, above about 2% based on the finished catalyst.

While the added complication resulting from using the silica-alumina gel properly prepared as a fourth and separate component of the catalyst slurry composed of the exchange zeolite alumina and clay is compensated by the improved catalytic properties of the spray dried catalyst, we have found that a further improvement in catalytic properties as well as in an improvement in the process of producing the four component catalyst is obtained by encapsulating the zeolite with the silica alumina gel either prior to or after the exchange of the zeolite with polyvalent cations and then forming a slurry of the encapsulated and exchanged zeolite with the hydrated alumina and clay and then spray drying the slurry. The following examples are given as an illustration of our invention.

EXAMPLE 1

This example illustrates the results obtained when an exchange zeolite is formulated as in the well known prior art methods of spray drying a slurry of hydrated alumina, clay and zeolite of the Y type which has been exchanged with a salt of a monovalent cation such as H or $NH_4$, a polyvalent cation such as a divalent cation for example Ca, Mg, or a trivalent cation such as a rare earth cation or mixtures thereof, or by an exchange reaction with a salt of the monovalent cation $NH_4$ or an acid. (See the aforesaid applications).

A slurry of a sodium Y type zeolite (see our above copending applications at a pH of 12.5 and containing about 25% solids is acidified with sulfuric acid to a pH of 3.5. The slurry is filtered, and the filter cake is slurried to a solid content of about 25%. The resultant slurry is reacted with rare earth sulfate solution as described in U.S. Pat. No. 3,446,727, without introducing other metallic cations, to form an exchanged zeolite of about 10–15% by weight of rare earth ions expressed as rare earth oxides based upon the zeolite content on a volatile-free basis. The slurry is filtered and washed substantially sulfate free and is reslurried to about 25% to 30% solids content. This slurry of exchanged zeolites is used in the following examples:

| | |
|---|---|
| $Na_2O$ | 4.5 by weight |
| ReO | 12.0% by weight |
| $Al_2O_3$ | 26.0% by weight |
| Remainder silica ($SiO_2$) | |
| ReO comprises about 60% | |
| $La_2O_3$ and about 40% | |
| $CeO_2$ by weight | |

EXAMPLE 2

Four hundred grams, on a volatile-free basis of a pseudoboehmite was peptized with 4.227 liters of water to which had been added 38 ml of 100% formic acid with moderate stirring for about 30 minutes. To this mixture was added 1,238 grams, on a volatile-free basis of ball clay and 400 grams of acid-treated halloysite referred to above, and the mixture was vigorously stirred for about 15 minutes. To the resultant mixture was added 463 grams, on a volatile-free basis, of the exchanged zeolite produced as in Example 1, with vigorous agitation. The mixture was spray dried at an inlet temperature of the flame of about 870°. The outlet temperature of the combustion gases from the spray drier was 330° F. The air nozzle of the spray drier was at 25 psig pressure. The spray-drier feed was introduced at 21 psig pressure. Approximately 55% by weight of the finished spray-dried catalyst, collected as particles of 70 micron average diameter, determined by the above attrition index procedure on about 10 samples, showed a mean attrition index of about 45 with a 1 sigma of 14. The catalyst had a conversion by the above procedure as follows:

| °F. | % Conversion |
|---|---|
| 1450 (M) | 70 |
| 1500 (S) | 60 |
| 1550 (S+) | 20 |

The analysis of that product normalized on a volatile-free basis was as follows:

| | |
|---|---|
| $SiO_2$ | 51 Weight % |
| $Al_2O_3$ | 41 Weight % |
| ReO* | 2.33 Weight % |
| $Fe_2O_3$ | 0.71 Weight % |
| $TiO_2$ | 1.29 Weight % |
| $Na_2O$ | 0.80 Weight % |
| $SO_3$ | 1.13 Weight % |
| V.M. | 15.4% |

* Rare Earth Oxides

Example 3 illustrates the advantage obtained from a four component catalyst by addition of a properly prepared silica alumina gel to the slurry shown in Examples 1 and 2, in place of the pseudoboehmite, prior to spray drying.

EXAMPLE 3

The catalyst is produced according to the procedure of Examples 1 and 2 except that part of the clay is replaced by a silica alumina gel in forming a precursor slurry.

The silica alumina gel is prepared as follows: 5017 grams of sodium silicate (28.7% $SiO_2$-8.9% $Na_2O$ by weight) equivalent to 1440 grams of $SiO_2$ was dissolved in water to a concentration of 5–10% $SiO_2$. The slurry solution was acidified to a pH of eleven with sulfuric acid. 26.896 kilograms of an aluminum sulfate solution (equivalent to 1560 grams and $Al_2O_3$) was gradually added to the acidified solution with constant agitation. The weight ratio of the $SiO_2$ to the $Al_2O_3$ in the mixture should be from about 45% to 52% of $Al_2O_3$. The pH at the end of the addition of the aluminum sulfate should be in the range of about 3 to about 3.5. The solution is passed through a colloid mill to be well homogenized. The homogenized solution is made alkaline with ammonium hydroxide with constant and vigorous agitation to adjust the mixture to a pH of about 9.5 to about 9.8.

The mixture is vigorously stirred and the pH is maintained by suitable adjustment for about 2 hours to insure uniformity of the mixture. It is then heated to a temperature of about 75° to 80° C for about 30 minutes and then immediately filtered and the filter cake washed with hot distilled water of about 80° C. The wash slurry is then slurried to a solid content of about 5% in distilled water which contained about 2 of ammonium nitrate and then filtered. The filter cake was then again slurried with ammonium nitrate solution as in the last previous step. The filter cake from the last step was again reslurried to an ammonium nitrate solution as above and filtered. The filter cake from the last filtration above was washed with distilled water to a sodium content of about 0.1 to about 0.2% $Na_2O$ and sulfate content of about 0.2 to about 0.3% $SO_3$. It is desired that the $Na_2O$ content and the $SO_3$ content shall be as slow as possible.

The silica and alumina gel thus produced is preferably maintained in a sealed container prior to use in the catalyst of our invention. It should be used as promptly as possible since aging of the gel will impair its properties in producing a good attrition resistant catalyst.

The slurry of Examples 1 and 2 was modified by replacing the part of the clay with silica alumina-gel as produced as above. The ratio of the components on a volatile free basis was 19% by weight of the rare earth exchange zeolite, and 33% of clay, and 18% pseudoboehmite and 30% of the gel produced as above, all on a volatile free basis. The catalyst was otherwise produced as in Example 1.

The following properties are representative of catalysts produced above: Attrition Index was 11%; the M activity, at 1450° steaming was 73%; microactivity at (1500° F Steaming) 62% (S activity) and the microactivity at 1550° F steaming (S+ Steaming) was 30%.

While silica-alumina gel improves both the catalytic activity and the Attrition Index as compared with the catalyst of Examples 1 and 2, the difficulties of first preparing a silica-alumina gel of sufficiently low Na content, we have found may be avoided by encapsulating the zeolite either before or after exchange. The encapsulated zeolite is thus readily washed substantially free of Na with much less difficulty than when the silica-alumina gel is prepared separately and mixed with the zeolite, clay and alumina. The resultant catalyst is not only improved in catalytic activity but also in attrition resistance.

EXAMPLE 4

To encapsulate the zeolite in the silica-alumina gel prior to exchanging of the faujasite zeolite and incorporation into the matrix, the following procedure may be followed:

N brand sodium silicate (28.7% $SiO_2$:7.8% $Na_2O$:) containing 7% by weight of silica at a pH of 12.5 to 13 is acidified to a pH of 11 with dilute sulfuric acid of 1 to 1 concentration under constant agitation. The exchanged faujasite zeolite produced as in Example 1, is stirred into this solution for 30 minutes to assure good dispersion. An aluminum sulfate solution at a concentration of about 4 to 5 weight percent $Al_2O_3$ is introduced with vigorous agitation for an hour to lower the pH to about 3 to 3.5. The pH of the slurry is adjusted to about 9 to 9.5 using ammonium hydroxide solution. The slurry is heated to about 50 to 80° C. for an hour.

The slurry is filtered and washed and reslurried and washed with 2% of ammonium nitrate and finally with distilled wash water in accordance with the procedures set forth in Example 1 and spray dried. The properties of the catalyst produced by encapsulating the exchanged zeolite as above, is typically as set forth hereinbelow.

Microactivity M activity 76%, S activity 63%, S+ activity 36%, and Attrition Index 8.

For purposes of comparison, the results of the various procedures may be tabulated as follows:

| Catalyst Sample | M Activity | S Activity | S+ Activity | Attrition Index |
| --- | --- | --- | --- | --- |
| Examples 1 & 2 | 70 | 60 | 20 | 40 |
| Example 3 | 73 | 62 | 30 | 21 |
| Example 4 | 76 | 63 | 36 | 8 |

The improvement in the S+ activity and attrition resistance of 50% by the silica-alumina gel of Example 3, as compared with Example 2, and the improvement of 180% in S+ activity in Example 4, and about 500% in Attrition Index illustrates the unexpected nature of the invention occasioned by substituting a portion of the clay in the three compound zeolite, alumina clay catalyst in the silica-alumina gel of our invention.

EXAMPLE 5

If at the stage of the operation, after the slurry is heated to 70° to 80° C. as in Example 4, the zeolite has not been previously exchanged with polyvalent cations, it may be exchanged at this point in the treatment. Thus, the slurry encapsulated unexchanged zeolite either of the X type or the Y type has its pH adjusted to a pH of 3.5-7 with sulfuric acid and is exchanged with rare earth using the procedures as in Example 1 but preferably at a constant pH of about 6 or less employing the procedures previously described in connection with Example 1.

I claim:

1. A method of forming a cracking catalyst which comprises mixing a faujasite type zeolite with sodium silicate to form a slurry, adjusting the pH of the slurry to about 3 to about 3.5 by addition of aluminum sulfate, adding ammonium hydroxide to adjust the pH to about 9 to about 9.5, forming a silica-alumina gel and zeolite mixture separating the zeolite and silica-alumina gel mixture from the slurry and washing the separated mixture and further exchanging the said zeolite with a salt solution, other than an alkali metal salt solution, and drying the zeolite.

2. The process of claim 1 in which the first mentioned zeolite is a rare earth Y.

3. The process of claim 1 in which the zeolite in the slurry at pH of about 9 to about 9.5 is exchanged with rare earth salt solution.

* * * * *